(12) United States Patent
Doron

(10) Patent No.: US 10,616,620 B1
(45) Date of Patent: Apr. 7, 2020

(54) LOW BITRATE ENCODING OF SPHERICAL VIDEO TO SUPPORT LIVE STREAMING OVER A HIGH LATENCY AND/OR LOW BANDWIDTH NETWORK

(71) Applicant: Ambarella International LP, Santa Clara, CA (US)

(72) Inventor: Moshe Doron, San Francisco, CA (US)

(73) Assignee: Ambarella International LP, Santa Clara, CA (US)

( * ) Notice: Subject to any disclaimer, the term of this patent is extended or adjusted under 35 U.S.C. 154(b) by 349 days.

(21) Appl. No.: 15/092,071

(22) Filed: Apr. 6, 2016

(51) Int. Cl.
*H04N 21/2365* (2011.01)
*H04N 21/81* (2011.01)
*H04N 21/647* (2011.01)
*H04N 21/2187* (2011.01)

(52) U.S. Cl.
CPC ... *H04N 21/23655* (2013.01); *H04N 21/2187* (2013.01); *H04N 21/64769* (2013.01); *H04N 21/816* (2013.01)

(58) Field of Classification Search
CPC .............................................. H04N 21/23655
See application file for complete search history.

(56) References Cited

U.S. PATENT DOCUMENTS

| 2007/0024706 A1* | 2/2007 | Brannon, Jr. | H04N 7/17318 348/142 |
|---|---|---|---|
| 2017/0084073 A1* | 3/2017 | Pio | G06T 15/20 |
| 2017/0237983 A1* | 8/2017 | Adsumilli | H04N 19/124 375/240.03 |

* cited by examiner

*Primary Examiner* — James M Anderson, II

(74) *Attorney, Agent, or Firm* — Christopher P. Maiorana, PC

(57) ABSTRACT

An apparatus comprising an interface and a processor. The interface may be configured to receive (i) a spherical video stream and (ii) data from a playback device to determine a region of interest. The processor may be configured to (a) generate an encoded spherical video stream from the spherical video stream, (b) select a target area for one or more upcoming frames of the encoded spherical video stream corresponding to the region of interest, (c) encode the target area using first parameters, (d) encode a remaining area of the encoded spherical video stream outside of the target area using second parameters and (e) present the one or more upcoming frames to the playback device. Encoding using the first parameters may have a different bitrate than using the second parameters.

20 Claims, 7 Drawing Sheets

LOW BITRATE ENCODING OF SPHERICAL VIDEO TO SUPPORT LIVE STREAMING OVER A HIGH LATENCY AND/OR LOW BANDWIDTH NETWORK

FIELD OF THE INVENTION

The invention relates to video encoding generally and, more particularly, to a method and/or apparatus for implementing low bitrate encoding of spherical video to support live streaming over a high latency and/or low bandwidth network.

BACKGROUND

Spherical video typically involves high resolution footage to capture the entire 360 degree field of view (FOV). Streaming spherical video involves a high bitrate link. Typical networks, like the Internet, have limited streaming bandwidth. Cellular networks also typically have limited bandwidth. Streaming high bitrate video over 3G/4G/LTE networks consumes a lot of data. In conventional spherical video playback, on the display side, the user sees only a small part of the spherical image. The small part of the spherical image that the user sees is called a region of interest (ROI).

Conventional spherical video playback typically streams the entire spherical field of view (i.e., a 360 degree field of view). Streaming the entire spherical field of view allows the ROI to be changed in response to the user moving his or her head. A change in ROI needs to happen very fast (typically <20 ms) to avoid a noticeable delay on the display side. Longer delays tend to provide a poor user experience, and in many cases trigger a sickness feeling.

It would be desirable to implement low bitrate encoding of spherical video to support live streaming over a high latency and/and low bandwidth network.

SUMMARY

The invention concerns an apparatus comprising an interface and a processor. The interface may be configured to receive (i) a spherical video stream and (ii) data from a playback device to determine a region of interest. The processor may be configured to (a) generate an encoded spherical video stream from the spherical video stream, (b) select a target area for one or more upcoming frames of the encoded spherical video stream corresponding to the region of interest, (c) encode the target area using first parameters, (d) encode a remaining area of the encoded spherical video stream outside of the target area using second parameters and (e) present the one or more upcoming frames to the playback device. Encoding using the first parameters may have a different bitrate than using the second parameters.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing (i) low bitrate encoding of spherical video, (ii) support for live streaming over high latency and/or low bandwidth network, (iii) a spherical video stream with a high bitrate portion and a low bitrate portion, (iv) a dynamic update of a spherical video stream, (v) an improved streaming efficiency that limits a negative impact to the end user, (vi) encoding based on what a user is viewing, (vii) a portion of a spherical video viewed by a user with compression that has less lossiness than a compression used for remaining portions of the spherical video and/or (viii) a system that may be implemented as one or more integrated circuits.

Figure 1:
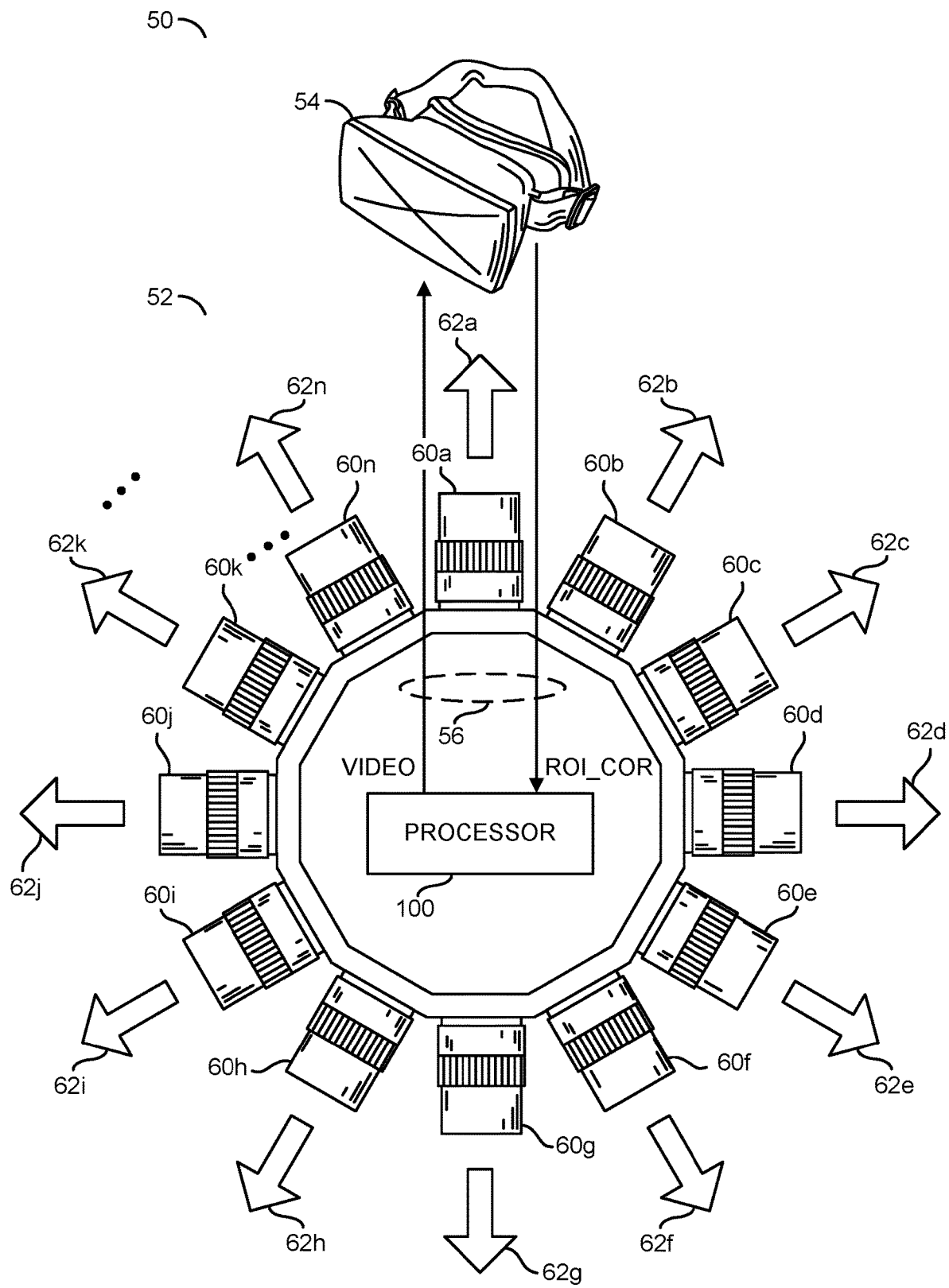
FIG. 1 is a diagram of an overall context of the invention.

Referring to FIG. 1, a block diagram of a system 50 is shown in accordance with an embodiment of the invention. The system 50 generally comprises a device (or camera) 52, and a device (or headset or display or playback device) 54. The camera 52 and the display 54 may be connected through a network 56. The camera 52 may be configured to capture a spherical field of view. In one example, the spherical field of view may allow an end user to view a video of the environment surrounding the camera 52 (e.g., a live stream). In another example, the spherical field of view may allow the end user to view a previously recorded video of the environment surrounding the camera 52. The playback device 54 may be configured to display the spherical field of view to the end user.

The camera 52 may be implemented as a spherical field of view camera (e.g., a camera configured to record spherical video, a 360 degree video and/or less than a 360 degree video, etc.). In some embodiments, the camera 52 may be implemented as a multi-sensor camera. In some embodiments, the camera 52 may be implemented as a wide angle (or fisheye) lens. The implementation of the camera 52 may be varied according to the design criteria of a particular implementation.

The headset 54 may be implemented as a display, a wearable headset, or other spherical video viewing device. The display 54 may be worn (or viewed) by the user. The display 54 may be configured to display video frames (e.g., spherical video frames) of the spherical video. The display 54 may output a portion of each of the spherical video frames in response to a direction the user is looking. The portion of each of the spherical video frames that is displayed may be a region of interest (ROI). The ROI may represent a field of view watched by a user of the display 54. For example, the display 54 may receive the spherical video frames and refresh the output to show only the ROI.

The display 54 may be configured to transmit a signal (e.g., ROI_COR) to the camera 52 (or capture device). The signal ROI_COR may be a coordinate signal that may contain information relating to the direction the user is looking (e.g., the ROI). The display 54 may generate the signal ROI_COR in response to the ROI displayed to the user. In an example, the display 54 may transmit the signal ROI_COR over the network 56. The signal ROI_COR may correspond to a field of view currently visible on the playback device 54.

The camera 52 generally comprises a number of capture devices 60a-60n. Each of the capture devices 60a-60n may be implemented as a sensor, a standalone camera, or other video capture device. Each of the capture devices 60a-60n is shown pointing in a corresponding direction 62a-62n. By capturing each of the directions 62a-62n, the camera 52 may capture a spherical view of the environment surrounding the camera 52. The camera 52 may include a processor 100. The processor 100 may be configured to encode video frames captured by each of the capture devices 60a-60n. In some embodiments, the processor 100 may be configured to perform video stitching operations to stitch video frames captured by each of the capture devices 60a-60n to generate the spherical field of view (e.g., the spherical video frames). The camera 52 may present a signal (e.g., VIDEO). The signal VIDEO may be an encoded video signal that may be presented to the display 54. In an example, the signal VIDEO may be an encoded (e.g., compressed or partially compressed) version of raw video data (e.g., pixels). For example, the signal VIDEO may be presented to the playback device 54 via the network 56.

The processor 100 may receive the signal ROI_COR (e.g., via the network 56). The spherical video signal VIDEO may have a number of regions (or windows) that may each be encoded at a different bitrate and/or amount of compression (to be described in more detail in connection with FIG. 3). The signal ROI_COR may be used by the processor 100 to adjust the encoding of the signal VIDEO. The processor 100 may be configured to encode a window slightly larger than the ROI displayed to the user using a high quality compression (e.g., high bitrate and/or less lossiness). The processor 100 may be configured to encode a remaining area of the spherical video in a lower quality compression (e.g., low bitrate and/or more lossiness). The size of the windows and/or the quality of the compression may be varied according to the design criteria of a particular implementation.

Generally, the high quality compression provides a version of the video (or portions of the video) captured by the camera 52 that has less lossiness than the lower quality compression. For example, the image quality of the high quality compression may be greater than the image quality of the lower quality compression. In some embodiments, a number of quantization parameters used for compression may be reduced for the lower quality compression.

Various factors may correspond to the type of compression. One factor may be a bitrate of the compression. In an example, the higher quality compression may have a higher bitrate (e.g., which may need a higher bitrate link to transfer via the network 56) than the lower quality compression. In another example, the lower quality compression may be a black (or blank) video. Another factor may be an amount of processing to encode and/or decode the compression. In an example, more time and/or power may be consumed by the processor 100 to generate one type of encoding (e.g., using H.265 encoding) than another type of encoding (e.g., using H.264 encoding). Similarly, more time and/or power may be consumed by the playback device 54 to decode the higher quality compression at a lower bitrate than the lower quality compression at a higher bitrate. In some embodiments, a variable bitrate may be used for the high quality and/or the lower quality compression. The bitrate, lossiness and/or processing used for the compression may be varied according to the design criteria of a particular implementation.

Figure 2:
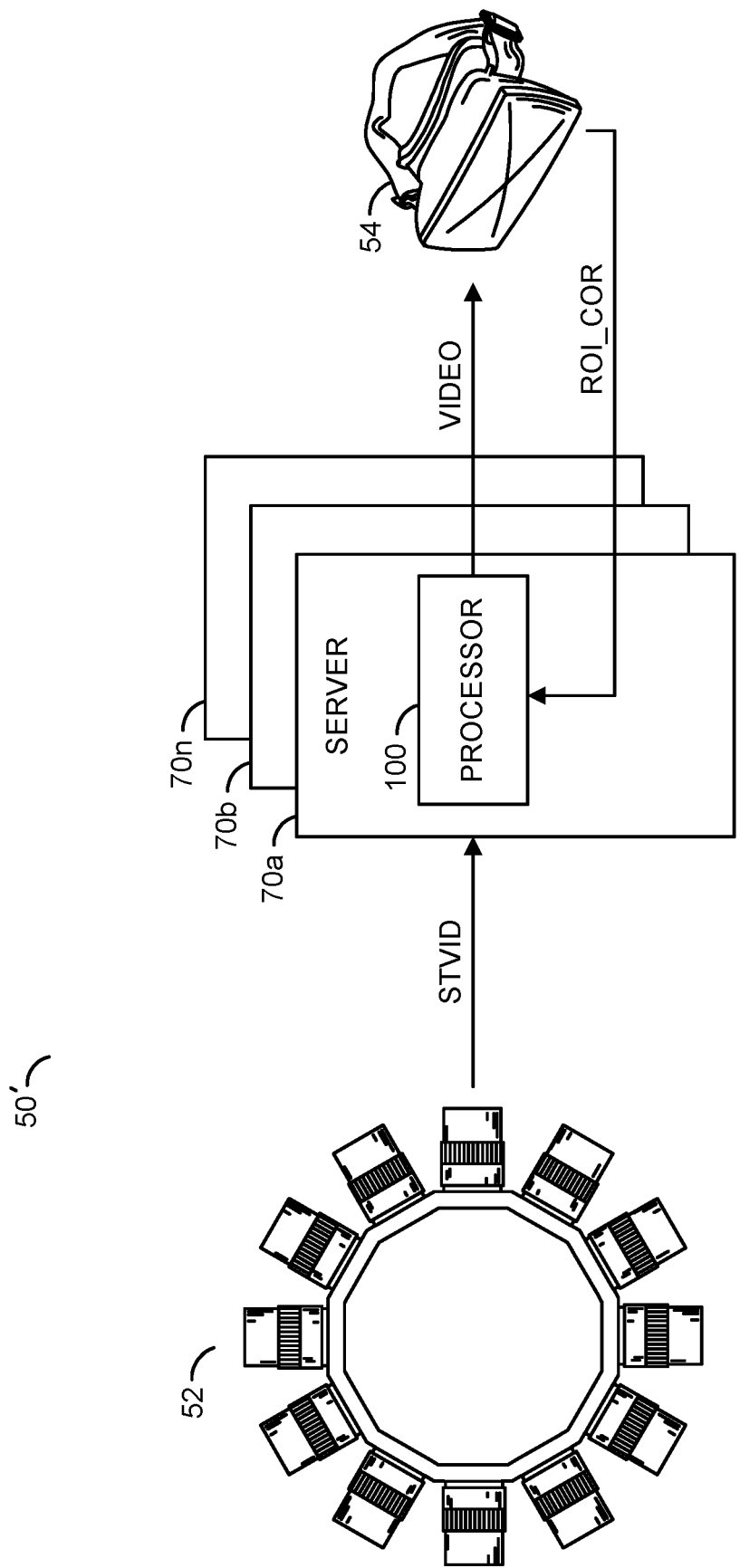
FIG. 2 is a diagram of an alternate context of the invention.

Referring to FIG. 2, a diagram of a system 50' illustrating an alternate context of the invention is shown. The system 50' may comprise the camera 52, servers 70a-70n and/or the playback device 54. The system 50' may comprise additional components. The system 50' shows the processor 100 implemented on the server 70a. Similarly, each of the servers 70a-70n may implement the processor 100. In an example, the servers 70a-70n may be implemented as a group of cloud-based scalable servers. By implementing a number of scalable servers 70a-70n, the processor 100 may have additional resources (e.g., power, processing capability, memory, etc.) available to process variable amounts of data from the camera 52. For example, the servers 70a-70n may be configured to scale (e.g., provision resources) based on demand.

The camera 52 is shown sending a signal (e.g., STVID) to the processor 100. The signal STVID may be a video signal derived from the capture devices 60a-60n. In an example, the signal STVID may be stitched from two or more of the capture devices 60a-60n. In some embodiments, the signal STVID may be encoded at the full bitrate of the capture devices 60a-60n. In some embodiments, signal STVID may be raw video data (e.g., uncompressed video data). For example, the signal STVID may be sent using a high bit-rate link (e.g., a content delivery network backhaul). In some embodiments, the processor 100 may generate the signal VIDEO based on the signal STVID. The processor 100 may generate the signal VIDEO having varying regions encoded at different bitrates (or amounts of lossiness). The signal VIDEO may be generated in response to the signal ROI_COR. The signal VIDEO and/or the signal ROI_COR may be transmitted using a low-rate link (e.g., a link that may be saturated by the signal STVID).

In some embodiments, the servers 70a-70n may be configured to stream the signal VIDEO to the playback device 54 (e.g., for live playback). For example, the servers 70a-70n may connect to the camera 52 using a high-rate link to receive the signal STVID. The processor 100 may perform operations to encode and/or transcode the signal STVID to generate the signal VIDEO in real-time (or near real-time). For example, the signal STVID may be a full (e.g., uncompressed), high-quality stream of the spherical video from the camera 52 to the servers 70a-70n, and the signal VIDEO may be a version of the spherical video STVID having at least two sections with different qualities streamed from the servers 70a-70n to the playback device 54.

In some embodiments, the servers 70a-70n may be configured to receive the signal STVID and transfer the signal VIDEO to the playback device 54 for playback at a later time. For example, the signal STVID may be uploaded to the servers 70a-70n (e.g., via an internet connection, or locally from a storage device such as a USB drive, an external memory card, a hard drive, a flash drive, etc.). The signal STVID may be stored by the server 70a-70n until requested by the playback device 54 (e.g., not streamed live). The processor 100 may be configured to encode and/or transcode the signal STVID and store the encoded and/or transcoded result.

For example, the servers 70a-70n may store the source signal STVID (e.g., the full, high quality video version of the captured environment), and one or more versions of the signal STVID may be encoded and/or transcoded by the processor 100 (e.g., various lower-quality versions of the signal STVID). The processor 100 may transfer the stored signal VIDEO comprising the high quality portion for the ROI and the lower-quality version of the entire spherical video (e.g., to be used for areas outside the ROI) based on information from the signal ROI_COR from the playback device 54. The processor 100 may stream one video signal comprising a target area (e.g., the window slightly larger than the ROI) having a high quality and another video stream comprising the entire spherical video stream having a low quality (e.g., to be used for areas outside the ROI) and the playback device 54 may combine the streams for playback.

The camera 52 implementing the processor 100 may be configured to generate the signal STVID and/or the signal VIDEO. In some embodiments, where the camera 52 is used in a video streaming application, the camera 52 may generate the signal STVID to be transcoded by the processor 100 on the servers 70a-70n for the playback device 54. In some embodiments, where the camera 52 is used for streaming, the processor 100 may transcode the captured video to locally (e.g., at the camera 52) generate the signal VIDEO for the playback device 54 (e.g., the camera 52 may be connected to the playback device 54). In some embodiments, the camera 52 may be configured to generate the full quality spherical source video STVID. The video STVID may be kept for storage. For example, the camera 52 may be connected to a storage device such as a flash storage card. The processor 100 may encode the signal STVID to generate the signal VIDEO at a later time.

Video data may be captured by sensors (e.g., the capture devices 60a-60n) of the camera 52. In some embodiments, the video data from the capture devices 60a-60n may be uncompressed (e.g., raw) video data (e.g., the signal STVID). In some embodiments, the video data STVID may be encoded at a high bitrate. For example, the signal STVID may be generated using a lossless compression and/or with a low amount of lossiness. In some embodiments, the video data captured by the capture devices 60a-60n may be presented to the processor 100 in the camera 52. In some embodiments, the video data captured by the capture devices 60a-60n may be presented to the processor 100 in the servers 70a-70n. The processor 100 may encode the video data captured by the capture devices 60a-60n to generate the signal VIDEO.

Encoding the signal VIDEO may be performed with various parameters to generate different bitrates. For example, a video encoded using one set of parameters may result in an encoded video having one bitrate (e.g., higher) and the same video encoded using another set of parameters may result in an encoded video having a different bitrate (e.g., lower). For example, one set of parameters may be used by the processor 100 to encode the target area of the upcoming video frames of the signal VIDEO and another set of parameters may be used by the processor 100 to encode the remaining area of the upcoming video frames of the signal VIDEO. Various parameters may be implemented. Encoding using parameters that result in a lower bitrate may result in a compression of the signal VIDEO (or a portion of the signal VIDEO) that may reduce bandwidth consumption when transmitting the encoded spherical video stream VIDEO. In one example, the parameters may be quantization parameters. In another example, the parameters may be a rate factor, deinterlacing, a constant bitrate, a variable bitrate, filters, video codecs, frame rate, a file container, etc. The types of parameters may be varied according to the design criteria of a particular implementation.

Figure 3:
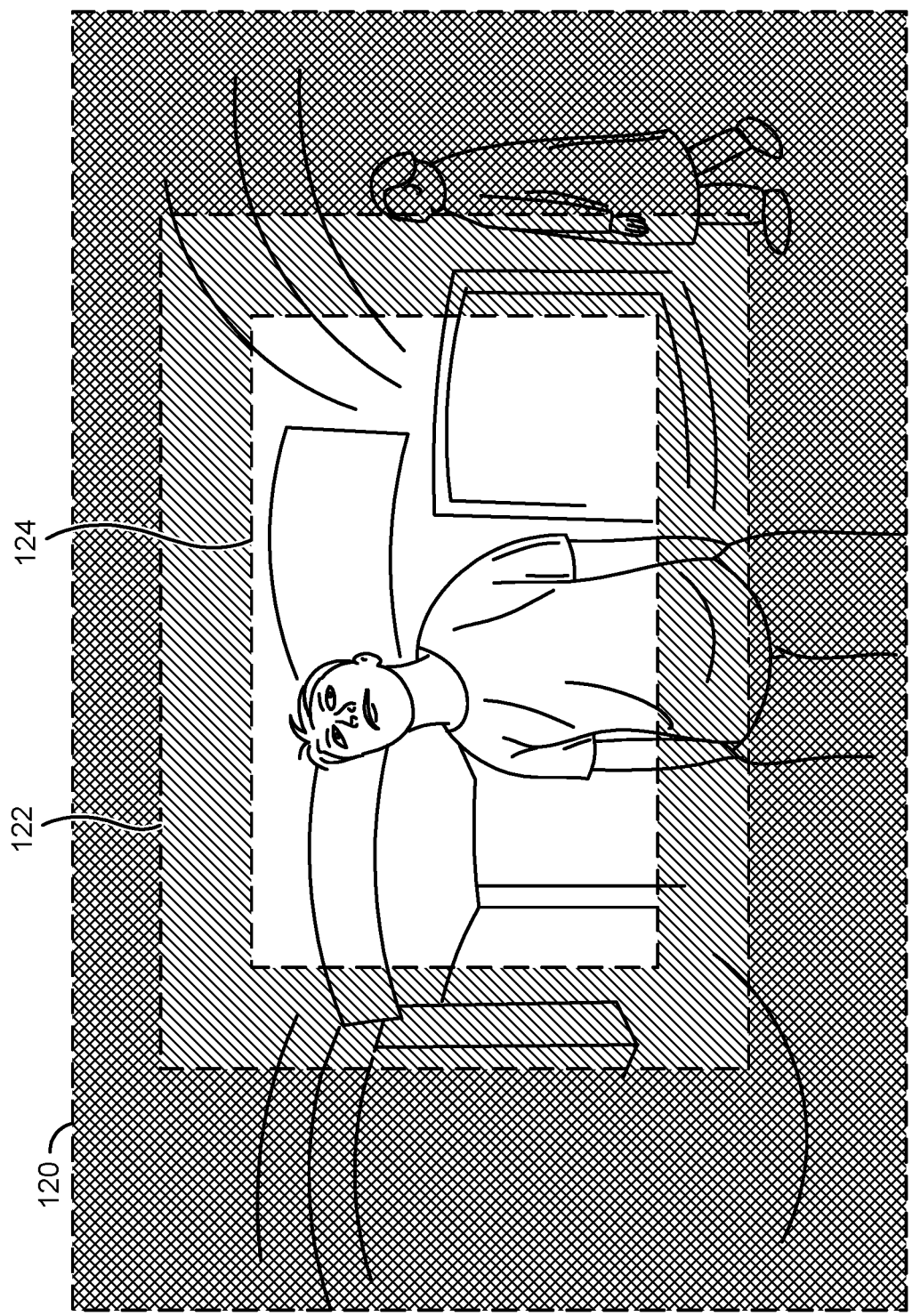
FIG. 3 is a diagram of a sample portion of video.

Referring to FIG. 3, a diagram of a sample portion of the signal VIDEO is shown. The portion may be an equirectangular projection of the spherical field of view. The equirectangular projection is shown having a slightly distorted representation of the captured video. For example, when the video is viewed by the user with the playback device 54, the captured video may appear as the spherical field of view (e.g., an immersive video). A window 120, a window 122 and a window 124 are shown. The window 122 may be slightly larger than the window 124.

The window 124 may be the ROI. For example, the ROI 124 may be the portion of the spherical video frame displayed on the playback device 54. The window 122 may be an additional area surrounding the ROI 124. The additional area 122 may be next to the ROI 124. The window 120 may represent a remaining area of the signal VIDEO (e.g., a region outside, the ROI 124 and/or the additional area 122). The size and/or amount of pixels comprising the remaining area 120, the additional area 122 and/or the ROI 124 may be varied according to the design criteria of a particular implementation.

The processor 100 may be configured to encode a target area of the upcoming video frames of the signal VIDEO using the high quality compression. The processor 100 may be configured to encode other portions of the signal VIDEO using a low quality compression. In some embodiments, the processor 100 may encode the signal VIDEO using additional (e.g., intermediate) quality compressions.

In one example, the target area (e.g., the area using the high quality compression) may be the additional area 122 and the ROI 124. The remaining area 120 may be encoded using the low quality compression. In another example, the target area may be the ROI 124 and the remaining area 120 and the additional area 122 may be encoded using the low quality compression. In yet another example, the ROI 124 may be encoded using the high quality compression, the additional area 122 may be encoded using the intermediate quality compression and the remaining area 120 may be encoded using the low quality compression.

The ROI 124 may be moved relative to the spherical field of view based on the signal ROI_COR. Similarly, the additional area 122 and the remaining area 120 may be moved. In some embodiments, the additional area 122 may surround the ROI 124. For example, the additional area 122 may be a border having a pre-determined number of pixels around the ROI 124. The size of the additional area 122 may be determined based on user input. For example, the size of the additional area 122 may be a number of pixels that an average user usually moves (e.g., by turning his or her head) when viewing the signal VIDEO. In another example, the size of the additional area 122 may be based on practical limitations (e.g., an amount of bandwidth available, a processing capability of the processor 100 and/or the playback device 54, etc.). In yet another example, the size of the additional area 122 may be based on a preference of the user (e.g., a user configuration). The size of the additional area 122 may be varied according to the design criteria of a particular implementation.

When the user makes a small change in head position, the image quality shown on the display 54 will remain high. The additional area 122 may implement a high quality region that may be larger than the displayed image of the ROI 124. For example, the playback device 54 may refresh the displayed region of interest in response to head movements and when the display of the playback device 54 is refreshed to the additional area 122, the quality of the section of the spherical video may remain high quality. The difference in size between the additional area 122 and the ROI 124 may be configured to accommodate small head movements. For example, the additional area 122 may act as a buffer for the ROI 124. When the user makes large changes in head position (less common), the image quality on the display 54 may drop for a short time until the new center for the ROI 124 is updated (e.g., the signal ROI_COR is sent to the processor 100 via the network 56) and the encoded settings change accordingly (e.g., the updated signal VIDEO is sent). The latency on the network 56 may impact the image quality for a short time (e.g., in the less common cases where the user makes large head movements). In many cases, the latency on the network 56 may not impact the image quality and/or latency at all.

Figure 4:
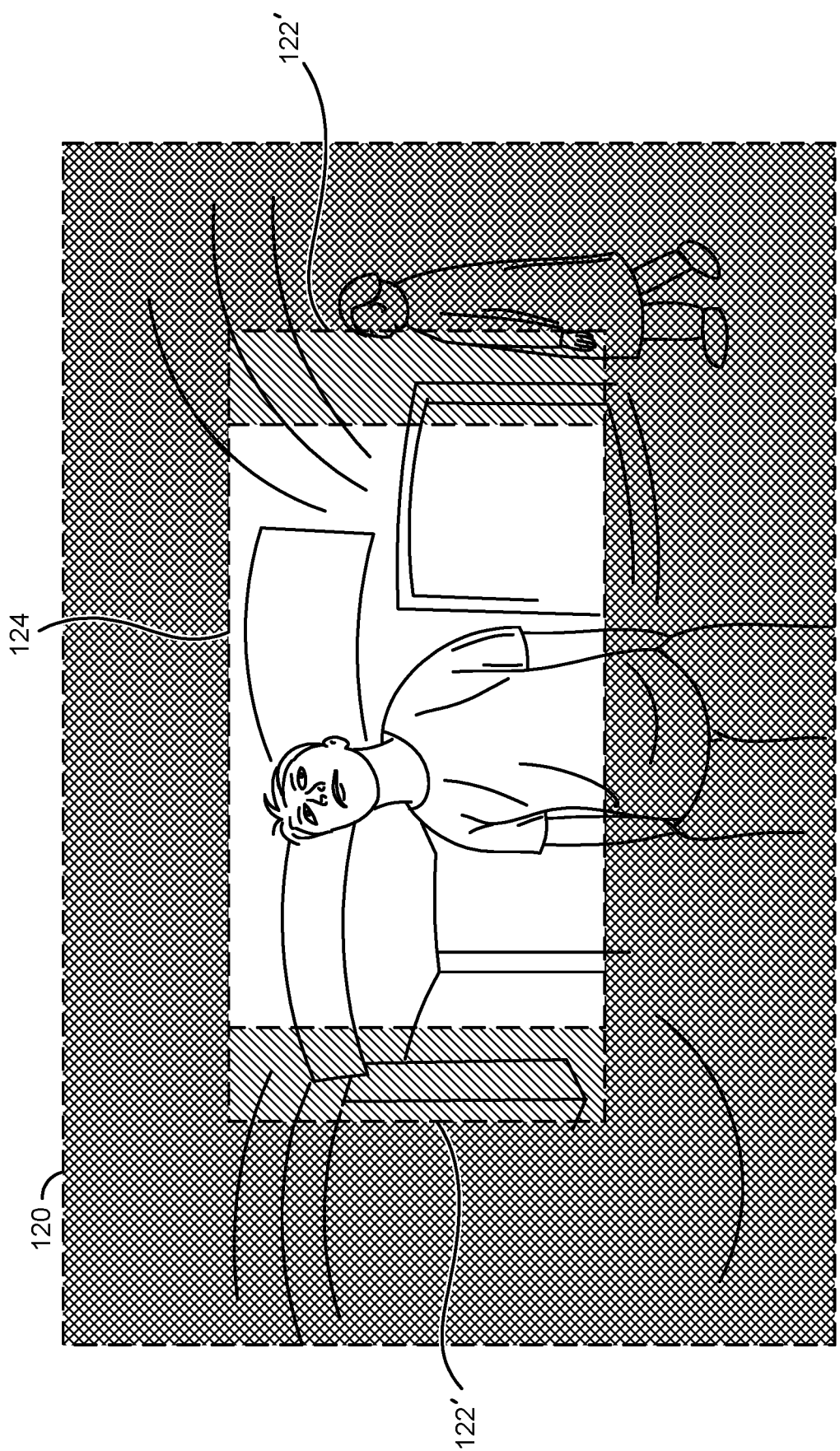
FIG. 4 is a diagram of an alternate sample portion of video.

Referring to FIG. 4, a diagram of an alternate sample portion of the signal VIDEO is shown. The equirectangular projection of the spherical field of view may have various arrangements of the remaining area 120, the additional area 122' and/or the ROI 124. The arrangement of the remaining area 120, the additional area 122' and/or the ROI 124 may be based on user preferences, practical limitations (e.g., processing capability of the processor 100, the playback device 54, network speed, etc.), and/or expected use of the signal VIDEO (e.g., the type of input the user is expected to provide).

In the example shown, the ROI 124 may be similar to the ROI 124 shown in FIG. 3. The ROI 124 may be encoded using the high quality compression. The remaining area 120 may be encoded using the low quality compression. The additional area 122' may be encoded using the high quality compression (e.g., the additional area 122' may be part of the target area). In some embodiments, the additional area 122' may be encoded using an intermediate quality compression.

The additional area 122' is shown as two segments of the signal VIDEO next to the ROI 124. In the example shown, the additional area 122' is shown as a portion of the signal VIDEO to the left of the ROI 124 and a portion of the signal VIDEO to the right of the ROI 124. In some embodiments, the additional area 122' may be a portion of the signal VIDEO above the ROI 124 and a portion of the signal VIDEO below the ROI 124. For example, the additional area 122' may not surround the ROI 124 as a continuous segment. The width and/or height of the additional area 122' may be varied according to the design criteria of a particular implementation.

In some embodiments, the additional area 122' may be selected based on an expected input from the user. For example, the signal VIDEO captured by the camera 52 may be a spherical video of an indoor environment. Since the indoor environment may have little of interest when the user looks up and/or down (e.g., the user may see the ceiling and the floor which may be considered uninteresting), the additional area 122' may be to the left and/or right of the ROI 124. The expected input may be that the user may turn his or her head to the left or right often and rarely look up or down. For example, the additional area 122' may be configured to cover a larger portion of the signal VIDEO to the left and/or right of the ROI 124 than the additional area 122 (shown in FIG. 3) may cover to the left and/or right of the ROI 124 without increasing the amount of bandwidth needed for transmission of the signal VIDEO.

Figure 5:
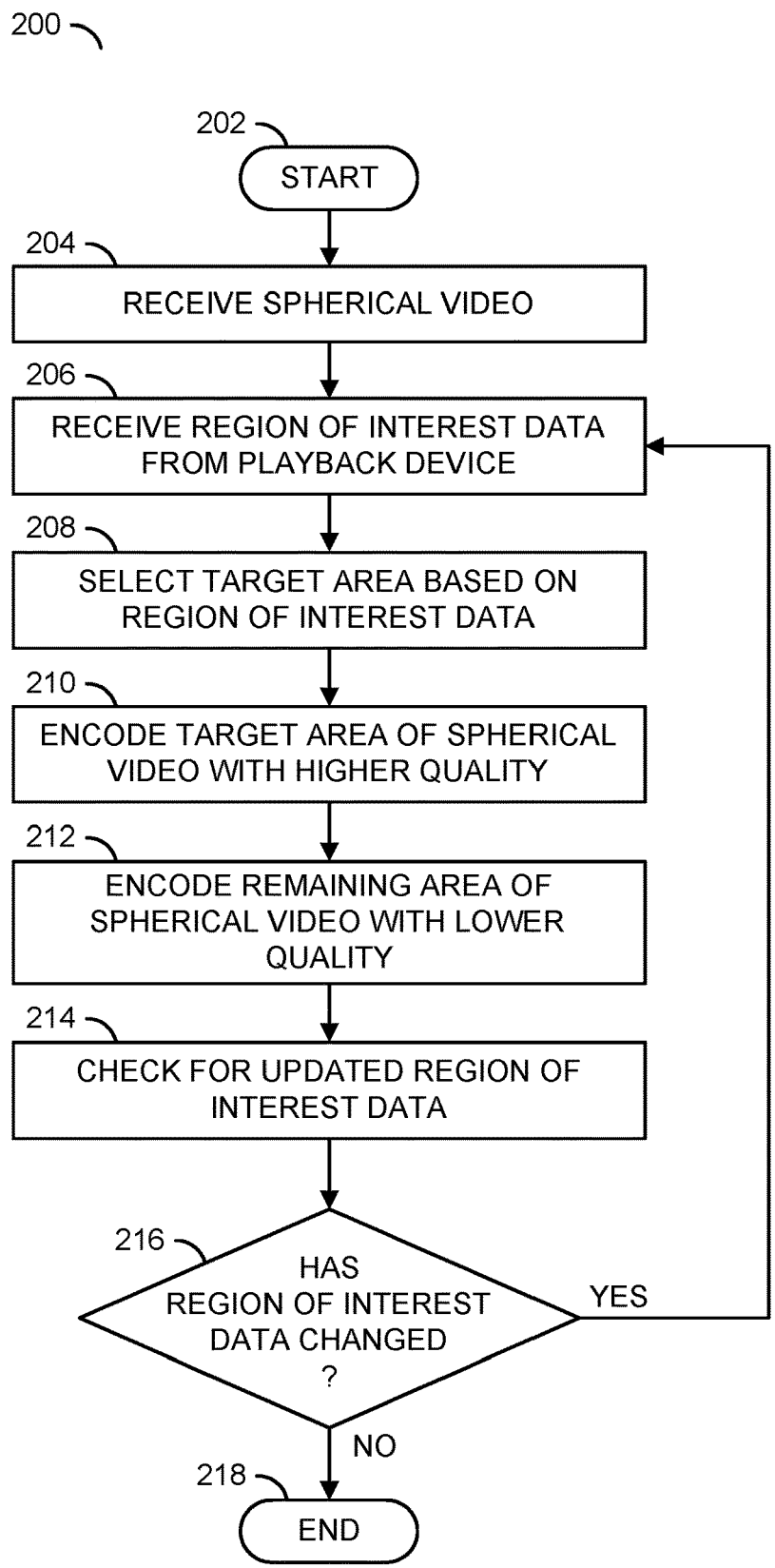
FIG. 5 is a flow diagram illustrating a method for encoding areas of a spherical video based on a region of interest.

Referring to FIG. 5, a method (or process) 200 is shown. The method 200 may encode areas of a spherical video based on a region of interest. The method 200 generally comprises a step (or state) 202, a step (or state) 204, a step (or state) 206, a step (or state) 208, a step (or state) 210, a step (or state) 212, a step (or state) 214, a decision step (or state) 216, and a step (or state) 218.

The state 202 may start the method 200. In the state 204, the processor 100 may receive the spherical video (e.g., from the camera 52 and/or the capture devices 60a-60n). Next, in the state 206, the processor 100 may receive the region of interest data (e.g., the signal ROI_COR) from the playback device 54. In the state 208, the processor 100 may select the target area based on the region of interest data for the upcoming frames of the encoded spherical video. For example, the processor 100 may select the ROI 124 as the target area. In another example, the processor 100 may select the ROI 124 and the additional area 122 as the target area. Next, the method 200 may move to the state 210.

In the state 210, the processor 100 may encode the target area of the spherical video with the higher quality. In the state 212, the processor 100 may encode the remaining area (e.g., the remaining area 120 when the target area comprises both the additional area 122 and the ROI 124) with the lower quality. The processor 100 may transmit the video (e.g., the signal VIDEO) to the playback device 54. In the state 214, the processor 100 may check for updated region of interest data (e.g., the signal ROI_COR received from the playback device 54). Next, the method 200 may move to the decision state 216.

In the decision state 216, the processor 100 may determine whether the region of interest has changed (e.g., based on the data in the signal ROI_COR). If the region of interest has changed, the method 200 may return to the state 206. If the region of interest has not changed, the method 200 may move to the state 218. The state 218 may end the method 200.

Figure 6:
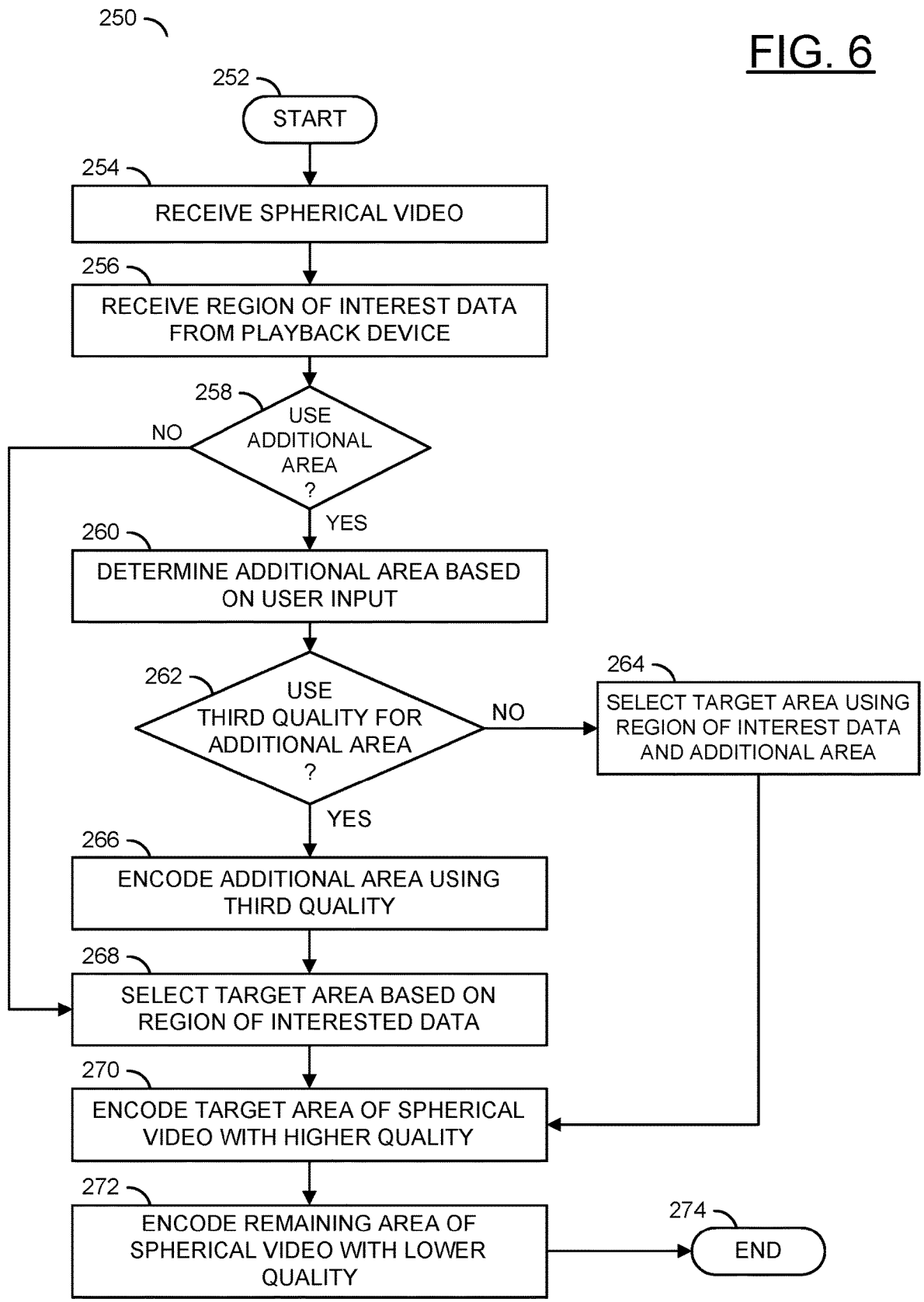
FIG. 6 is a flow diagram illustrating a method for encoding an additional area around a region of interest.

Referring to FIG. 6, a method (or process) 250 is shown. The method 250 may encode an additional area around a region of interest. The method 250 generally comprises a step (or state) 252, a step (or state) 254, a step (or state) 256, a decision step (or state) 258, a step (or state) 260, a decision step (or state) 262, a step (or state) 264, a step (or state) 266, a step (or state) 268, a step (or state) 270, a step (or state) 272, and a step (or state) 274.

The state 252 may start the method 250. In the state 254, the processor 100 may receive the spherical video. In some embodiments, the spherical video may be received from the capture devices 60a-60n. In some embodiments, the spherical video may be the signal STVID. In the state 256, the processor 100 may receive the region of interest data (e.g., the signal ROI_COR) from the playback device 54. Next, the method 250 may move to the decision state 258.

In the decision state 258, the processor 100 may determine whether to use the additional area 122 as part of the target area. For example, a user setting may be selected to determine whether or not the additional area 122 should be part of the target area. If the additional area 122 is not used as the target area, the method 250 may move to the state 268. If the additional area 122 is used as part of the target area, the method 250 may move to the state 260. In the state 260, the processor 100 may determine the size of the additional area 122 for the upcoming frames of the spherical video based on the user input (e.g., the average input by the user). For example, the average input may be an amount of movement corresponding to a small change to the region of interest. Next, the method 250 may move to the decision state 262.

In the decision state 262, the processor 100 may determine whether to use a third quality (e.g., one of the intermediate quality compressions) for the additional area 122. For example, a user setting may be selected to determine whether or not to use the third quality and/or the bitrate of the third quality. If the third quality is not used for the additional area 122, the method 250 may move to the state 264. In the state 264, the processor 100 may select the target area using the ROI 124 and the additional area 122. Next, the method 250 may move to the state 270. If the third quality is used for the additional area 122, the method 250 may move to the state 266.

In the state 266, the processor 100 may encode the additional area 122 using the third quality. Next, in the state 268, the processor 100 may select the target area of the upcoming video frames of the spherical video based on the ROI 124. Next, in the state 270, the processor 100 may encode the target area of the spherical video with the higher quality. In the state 272, the processor 100 may encode the remaining area of the spherical video with the lower quality. The processor 100 may stream the signal VIDEO to the playback device 54. Next, the method 250 may move to the state 274. The state 274 may end the method 250.

Figure 7:
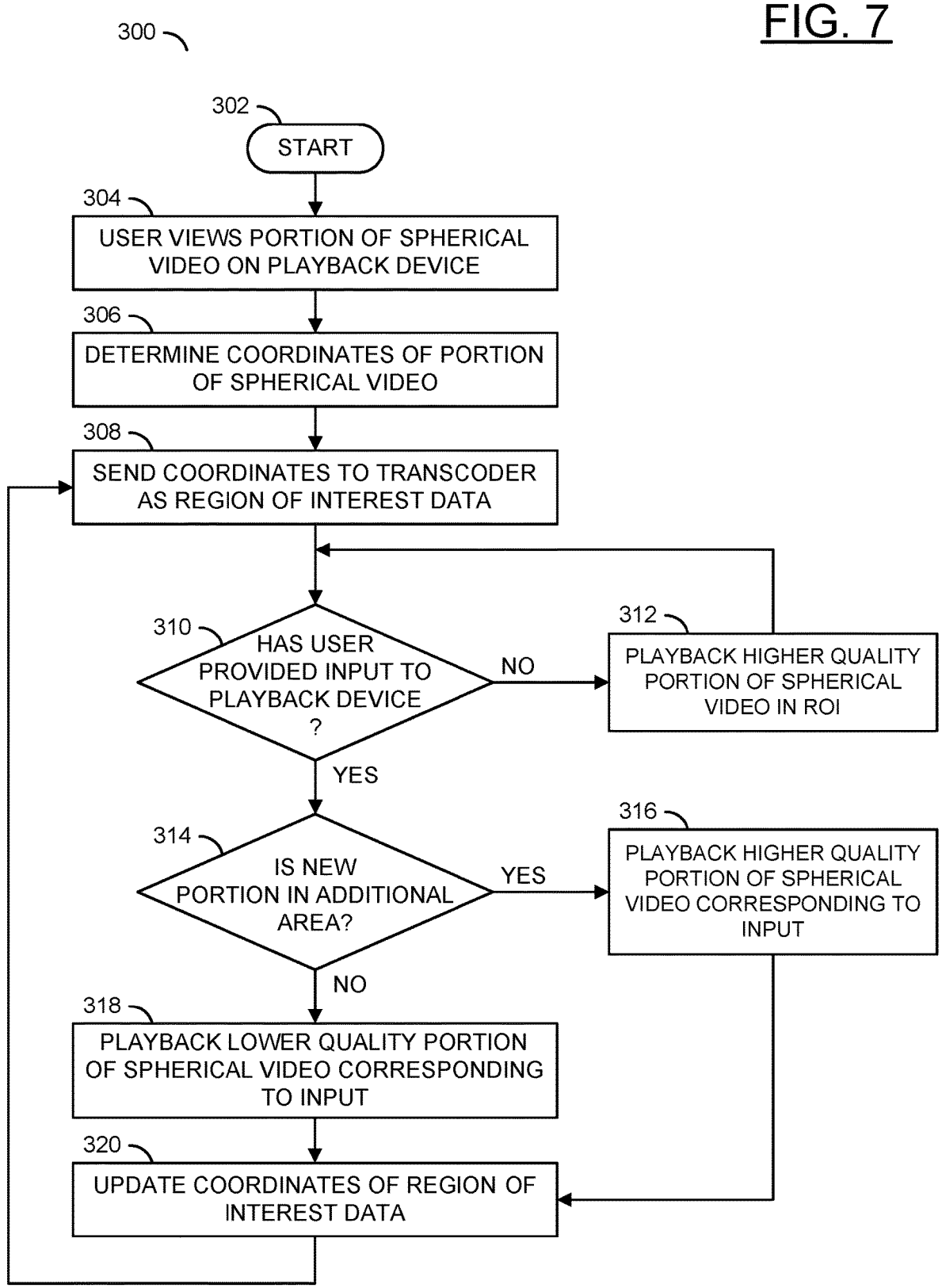
FIG. 7 is a flow diagram illustrating a method for playback of a spherical video on a playback device.

Referring to FIG. 7, a method (or process) 300 is shown. The method 300 may playback of a spherical video on a playback device. The method 300 generally comprises a step (or state) 302, a step (or state) 304, a step (or state) 306, a step (or state) 308, a decision step (or state) 310, a step (or state) 312, a decision step (or state) 314, a step (or state) 316, a step (or state) 318, and a step (or state) 320.

The state 302 may start the method 300. In the state 304 the user may view the portion (e.g., the region of interest) on the playback device 54. Next, in the state 306, the playback device 54 may determine the coordinates of the portion of the spherical video (e.g., the region of interest coordinates). In the state 308, the playback device 54 may send the coordinates to the transcoder (e.g., the processor 100) as the region of interest data (e.g., the signal ROI_COR). Next, the method 300 may move to the decision state 310.

In the decision state 310, the playback device 54 may determine whether the user has provided input to the playback device 54 (e.g., whether the user has moved his or her head). If the user has not provided input to the playback device 54, the method 300 may move to the state 312. In the state 312, the playback device 54 may playback the higher quality portion of the spherical video in the ROI 124. Next, the method 300 may return to the decision state 310. If the user has provided input to the playback device 54, the method 300 may move to the decision state 314.

In the decision state 314, the playback device 54 may playback a new portion of the signal VIDEO in response to the input. The quality of the playback may depend on whether or not the updated region of interest is in the additional area 122. If the new portion is in the additional area 122, the method 300 may move to the state 316. In the state 316, the playback device 54 may playback the higher quality portion of the spherical video corresponding to the input from the user. For example, if the input is a small head movement, the signal VIDEO may still have the high quality compression in the additional area 122 available for display. Next, the method 300 may move to the state 320.

In the decision state 314, if the new portion is not in the additional area 122, the method 300 may move to the state 318. In the state 318, the playback device 54 may playback the lower quality portion of the spherical video corresponding to the input from the user. For example, if the input is a large head movement, the signal VIDEO may not have the high quality compression in the area where the user is looking. Next, the method 300 may move to the state 320. In the state 320, the playback device 54 may update the coordinates of the region of interest data (e.g., the data in the signal ROI_COR). Next, the method 300 may return to the state 308.

In some embodiments, the playback device 54 may implement the state 312, the state 316 and/or the state 318 by performing a refresh of the region of interest displayed to the user. For example (e.g., the state 312), when the user has not moved their head (e.g., provided no input) the playback device 54 may refresh the region of interest and the region of interest may still be the high quality portion of the signal VIDEO in the ROI 124. In another example (e.g., the state 316), when the user has moved their head but the region of interest displayed by the playback device 54 is still within the additional area 122 and/or the ROI 124, the playback device 54 may refresh the region of interest and the region of interest displayed may still be the high quality portion of the signal VIDEO in the additional area 122 and/or the ROI 124. In still another example (e.g., the state 318), when the user has moved their head and the region of interest displayed by the playback device 54 is not within the additional area 122 and/or the ROI 124, the playback device 54 may refresh the region of interest and the region of interest displayed may be the remaining area 120 (e.g., the low quality portion of the spherical video signal VIDEO). Generally, the playback device 54 updates the region of interest displayed by performing a refresh and the refresh will display a portion of the spherical video file corresponding to the coordinates of the region of interest.

By sending the updated signal ROI_COR, the processor 100 may encode the new region of interest corresponding to where the user has moved his or her head. In some embodiments, the update of the signal ROI_COR may be generated after a pre-determined amount of time (e.g., periodically, an amount of time set by the user, a refresh rate of the playback device 54, etc.). In some embodiments, the update of the signal ROI_COR may be generated after a pre-determined amount of input (e.g., after the user moves his or her head a certain distance). The user may see the low quality compression for a short amount of time while the portion of the spherical video corresponding to the updated region of interest is encoded and sent to the playback device 54. When the updated signal VIDEO is received by the playback device 54 and output for the user, the user may see the higher quality compression. A length of time that the user sees the lower quality compression may be determined by a network latency and/or a processing capability of the processor 100.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. A method for generating an encoded spherical video stream in response to video data captured by a plurality of sensors, comprising the steps of:
 (A) receiving, at an interface, data generated by a playback device to determine a region of interest;
 (B) selecting, using a processor, a target area for one or more upcoming frames of said encoded spherical video stream corresponding to said region of interest;
 (C) encoding said target area using first parameters;
 (D) encoding entire fields of view of said one or more upcoming frames of said encoded spherical video stream using second parameters;
 (E) selecting and encoding an additional area next to said target area using third parameters, wherein said additional area comprises two unconnected segments;

(F) presenting said encoded spherical video stream comprising said encoded target area, said encoded additional area, and said encoded entire fields of view of said one or more upcoming frames to said playback device; and (G) repeating steps (A)-(F), wherein (i) encoding using said first parameters generates a different bitrate than using said second parameters and (ii) encoding using said third parameters generates a different bitrate than using said first or said second parameters.

2. The method according to claim 1, wherein said data received to determine said region of interest comprises coordinates corresponding to a field of view currently visible on said playback device.

3. The method according to claim 1, wherein an update to said region of interest is generated after a pre-determined amount of time.

4. The method according to claim 1, wherein said region of interest is based on an input to said playback device by a user.

5. The method according to claim 4, wherein said input comprises a head movement of said user.

6. The method according to claim 4, wherein an update to said region of interest is generated after a pre-determined amount of said input.

7. The method according to claim 1, wherein encoding using said second parameters results in a compression configured to reduce a bandwidth consumption when transmitting said encoded spherical video stream.

8. The method according to claim 1, wherein said additional area is selected based on an average input to said playback device by a user.

9. The method according to claim 8, wherein said average input comprises a movement corresponding to a small change to said region of interest.

10. The method according to claim 1, wherein said additional area is selected based on practical limitations.

11. The method according to claim 1, wherein said additional area is selected based on a user configuration.

12. The method according to claim 1, wherein said additional area is selected based on an expected use by a user.

13. The method according to claim 1, wherein said unconnected segments of said additional area (i) are above and below said region of interest in a first mode and (ii) are to the left and to the right of said region of interest in a second mode.

14. The method according to claim 1, wherein encoding using said third parameters generates (a) a higher bitrate than using said second parameters and (b) a lower bitrate than using said first parameters.

15. The method according to claim 1, wherein (i) said encoding using said second parameters is visible to a user for an amount of time based on a network latency before said target area is updated.

16. The method according to claim 1, further comprising the steps of:

streaming said target area of said encoded spherical video stream encoded with said first parameters to said playback device as a first video stream;

streaming said additional area of said encoded spherical video stream encoded with said third parameters to said playback device as a second video stream;

streaming said one or more upcoming frames of said encoded spherical video stream encoded with said second parameters to said playback device as a third video stream; and combining said first video stream, said second video stream and said third video stream using said playback device.

17. The method according to claim 1, wherein (i) a spherical video stream is uploaded to a network from a camera, (ii) said network (a) encodes said target area using said first parameters, (b) encodes said additional area using said third parameters and (c) encodes said one or more upcoming frames using said second parameters, and (iii) said network transmits said target area encoded using said first parameters, said additional area encoded using said third parameters and said one or more upcoming frames of said video stream encoded using said second parameters to said playback device as said encoded spherical video stream.

18. An apparatus comprising:

an interface configured to receive (i) a spherical video stream and (ii) data from a playback device to determine a region of interest; and a processor configured to generate an encoded spherical video stream from said spherical video stream, wherein said processor (a) selects a target area for one or more upcoming frames of said encoded spherical video stream corresponding to said region of interest, (b) encodes said target area using first parameters, (c) encodes an entire field of view of said one or more upcoming frames of said encoded spherical video stream using second parameters, (d) selects and encodes an additional area next to said target area using third parameters, and (e) presents said encoded spherical video stream comprising said encoded target area, said encoded additional area, and encoded entire fields of view of said one or more upcoming frames to said playback device, wherein (i) said additional area comprises two unconnected segments, (ii) encoding using said first parameters generates a different bitrate than using said second parameters, and (iii) encoding using said third parameters generates a different bitrate than using said first or said second parameters.

19. The apparatus according to claim 18, wherein said apparatus is configured to live stream said target area encoded using said first parameters, said additional area encoded using said third parameters, and said one or more upcoming frames encoded using said second parameters to said playback device.

20. The method according to claim 1, wherein said second parameters provide a blank video frame.

* * * * *